2,962,471
Patented Nov. 29, 1960

2,962,471
ACRYLIC MODIFIED BONDING AGENT

Edgar Reed Lang, Glenside, and Robert L. Kelso, Yardley, Pa., assignors to Rohm & Haas Company, Philadelphia, Pa., a corporation of Delaware No Drawing. Filed Apr. 15, 1958, Ser. No. 728,552

4 Claims. (Cl. 260—45.4)

The present invention relates to new compositions of matter comprising (a) a member of the group consisting of at least one polymerizable monoethylenically unsaturated monomer free from reactive hydrogen atoms and consisting of carbon and hydrogen or carbon, hydrogen and oxygen and mixtures of said monomers with unsaturated polyesters copolymerizable therewith, (b) glycidyl acrylate or methacrylate or an hydroxyalkyl acrylate or methacrylate in which the alkyl group has from two to four carbon atoms, (c) acrylic or methacrylic acid, and (d) alkenyl tri(alkoxy)silane in which the alkenyl group has from two to four carbon atoms and in which the alkoxy group contains one to four carbon atoms, each of (a), (b), (c), and (d) being present in the compositions in parts by weight as follows: (a) 98 to 86 parts, (b) 0.5 to 5 parts, (c) 1 to 4 parts, and (d) 0.5 to 5 parts. This invention also relates to products formed as a result of polymerizing the aforesaid new compositions, either per se or in the presence of other materials.

This application is a continuation-in-part of our application Serial No. 709,180, filed January 16, 1958 and now abandoned.

The compositions of the present invention are particularly suitable for bonding glass to plastic surfaces, in many cases making possible bonds between glass and plastic surfaces which are stronger than the glass itself. In other words, the adhesive strength of the bond between the glass and the plastic is higher than the cohesive strength of the glass itself.

Laminates consisting of two plates of glass with a plastic inner layer are, of course, well-known in the art, the so-called safety glass being a good example. In general, however, such safety glasses consist of two plates of relatively thick glass which are combined with a comparatively thin inner layer of flexible plastic which exhibits good mechanical adhesion to the glass surfaces. The plastic inner layer must, of necessity, be flexible and extensible in order to be able to absorb without loss of adhesion the forces set up by the expansion and contraction of the two glass plates. Furthermore, flexibility, extensibility and toughness are required of the plastic inner layer if it is to perform satisfactorily its function on shattering of the safety glass laminate.

A variety of plastic sheets are also well-known in the art, the more common articles of commerce being sheets of polymerized methyl methacrylate with or without additives, such as other copolymerized monomers, plasticizers, light stabilizers, etc., polystyrene, as well as sheets of polymerized polyesterstyrene compositions which may also contain copolymerized monomers other than styrene, such as, for instance, lesser amounts of methyl methacrylate. Such plastic sheets may be further modified by being reinforced with fillers such as glass fibers, glass fabrics, asbestos fibers, sisal fibers and the like, or by pigmentation or by coloring by means of dyes.

Although the above-described plastic sheets have found wide utility and good commercial acceptance, they are all characterized by one disadvantage which precludes their use in many applications in which their desirable properties could otherwise be used to good advantage. They are all deficient in abrasion resistance and thus can be relatively easily scratched, which scratches detract from their pleasing appearance and/or impair the otherwise excellent optical properties of the transparent type plastic sheets. Furthermore, some of these plastic sheets exhibit poor weather resistance and, when exposed outdoors, will gradually lose surface gloss, develop surface cracks and crazes and, in the case of the fiber reinforced sheets, frequently expose fibers on the surface due to weather erosion. These exposed fibers act as dirt collectors, resulting in unsightly appearance.

Means of protecting the surface of the aforementioned plastic sheets have long been sought, with the realization that means, to be successful, must not detract from the desirable properties inherent in the plastic sheets themselves. Numerous surface coatings and surface treatments have been tried and all proven to be unsatisfactory.

It has now been found that, by using the compositions of the present invention, it is possible to surface such plastic sheets with very thin glass sheets, the adhesive force of the bond being so high that the glass sheet becomes an integral part of the structure. Rather than the mechanical adhesion which is operative in the case of safety glass constructions, there is definite chemical interaction between the components of the composition of the present invention and the reactive groups on the glass surface. It has been surprisingly found that the rigid layer which is produced when the composition of the present invention is polymerized has such high adhesion to the glass surface that it can take up the stresses and strains produced by the expansion and contraction of the glass sheet as well as the forces developed by the differential expansion coefficients of the glass and the plastic sheet. This property is clearly demonstrated by an alternate hot and cold cycle test in which the glass-surfaced plastic sheet was heated to 200° C. and immediately plunged into a liquid bath maintained at a temperature of −70° C. No separation of the glass from the plastic layer occurred. A glass surfaced thermoplastic plastic sheet prepared as described hereinafter was heated in an air oven to 200° C. until the plastic sheet was soft and flexible. No separation between the glass and the plastic sheet occurred on bending the sheet into simple two dimensional curves. The glass cracked when the sheet was bent to smaller radii, but there was no separation of the glass from the plastic.

These glass surfaced plastic sheets exhibit surprisingly high point loading values, even when surfaced with a glass layer only one to three thousandths of an inch thick. These surprisingly high values are attributed to the exceedingly high adhesion provided by the compositions of the present invention.

The presence of all three additives, set forth hereinbefore as (b), (c), (d), is a prime requisite. Only when all three are present is it possible to obtain maximum adhesion. Furthermore, there is definite evidence of interaction between all three of the additives and the chemically active groups on the surface of the glass itself.

By employing the composition of the present invention as the adhesive layer between the thin glass surface and the plastic sheet, it is possible to prepare composite structures which are predominantly plastic and thus exhibit the basic properties of the specified plastic but which overcome the serious abrasion resistance deficiencies described hereinbefore. In the case of those plastic sheets which are deficient in weather resistance on outdoor exposure, the glass surfacing operation increases the weather resistance many fold. Fiber show on fiber filled sheets is completely prevented, thus lengthening appreciably the useful service life of such sheets.

It has been further found that the flexural modulus of the plastic sheet is appreciably increased when the plastic sheet is glass-surfaced using the composition of the present invention as adhesive. Even with very thin glass sheets and relatively thick plastic sheets, the flexural modulus of the composite structure approaches that of glass itself, a value appreciably higher than the flexural modulus of the unsurfaced plastic sheet.

The composition of the present invention may be employed in a number of ways, but the following two methods represent the preferred modes of use:

When employing previously polymerized plastic sheets as the plastic inner layer, a film of the composition of the present invention, suitably catalyzed, was spread on both sides of the plastic sheet. The glass, which had been previously acid washed, rinsed, and dried was then laid over the thin film of composition in such a way as to avoid trapping air bubbles. This assembly was then cured under sufficient pressure to maintain uniform contact between the glass sheet and the plastic sheet. After this curing period, the assembly was heated at elevated temperature as hereinafter described to remove any stresses.

Another preferred method of use involves the in situ polymerization of the composition of the present invention, as such or modified, suitably catalyzed, between two sheets of thin glass suitably supported in a polymerization cell as hereinafter described. This method is of somewhat more restricted applicability than the method hereinbefore described because of incompatibility factors which may arise between the monomeric and/or polymeric forms of the composition of the present invention and other polymerizable monomers, the use of which may be desirable. In those instances in which incompatibility factors are not encountered, however, this in situ polymerization method produces the highest bond strengths.

The compositions of the present invention, because of their high specific adhesion to glass, find wide utility in applications requiring the cementing of glass to a variety of other surfaces. Thus, for instance these compositions can be employed for bonding glass to glass, as in the manufacture of compound lenses; in the cementing of glass or plastic objects to metal backing surfaces; and in the cementing of plastic objects to glass backing surfaces.

In forming such composite structures, the compositions of the present invention are subjected to polymerizing conditions as hereinafter described.

Component (a) of this invention, as set forth on page 1 of this specification, can vary widely in composition and still be within the scope of the invention. This component consists of monomers or mixtures of monomers with or without added resinous viscosity increasers. The prime requisite is that the cured form of component (a) be a rigid hard resin. Thus, component (a) may be predominantly methyl methacrylate and the methyl methacrylate can be copolymerized with other polymerizable monovinylidene monomers free of active hydrogen and which consist of at most carbon, hydrogen, and oxygen including methyl acrylate, ethyl acrylate, ethyl methacrylate, ethyl ethacrylate, styrene, methylstyrene, vinyltoluene, vinylnaphthalene and similar unsaturated monomers. Another class of monoethylenically unsaturated compounds suitable for use with methyl methacrylate are the lower alkyl esters of itaconic acid, fumaric acid, and substituted homologs and isomers thereof. The vinyl esters of alkanoic acids may be satisfactorily employed, such compounds as, for example, vinyl acetate and vinyl stearate. While styrene may be used in lesser amounts with methyl methacrylate, it is not suitable as the predominant part of component (a) since the polystyrene formed on polymerization is not compatible with the other components of the compositions of this invention. When the monomer component is thickened with an unsaturated polyester as hereinafter set forth, styrene can be used as the monomer portion of component (a) or can constitute the predominant portion of a monomer mixture.

The resinous viscosity increasers may be of two types, preformed polymers soluble in the monomer mixture or unsaturated polyesters soluble in the monomer mixture. For example, if it is desired to use the monomer mixture as a thickened casting syrup, the viscosity can be increased by dissolving therein polymers formed by polymerizing the methyl, ethyl, isopropyl, cyclohexyl, isobornyl, benzyl, tert-butyl, tert-amyl, 2-ethylhexyl, dodecyl esters of acrylic and methacrylic acids or copolymers of such esters with other copolymerizable monovinylidene monomers as set forth hereinbefore to the extent of 1 to 30 parts by weight of polymer or copolymer dissolved in 99 to 70 parts by weight of the monomer or monomeric mixture. Other preformed polymers which are soluble in and compatible with the monomeric mixture and compatible with the polymerized mixture may be used to thicken the monomeric mixture when it is required that the polymerized mixture be transparent. Preformed polymers which are soluble in and compatible with the monomeric mixture, but incompatible with the polymerized mixture yield translucent polymerized compositions. These compositions are frequently attractive from a decorative standpoint.

Unsaturated polyesters may also be employed as thickening agents or viscosity increasers. These resins, prepared by the interaction of a combination of a saturated dicarboxylic acid, a monoethylenically unsaturated dicarboxylic acid and glycols or mixtures of glycols are well-known by those skilled in the art and are used commercially on a large scale with a variety of monomers, styrene being most commonly used therewith. The preparation and use of unsaturated polyesters of the hereinbefore described type is described in numerous United States patents, including U.S. 2,610,168 and U.S. 2,632,753. As described hereinafter, these unsaturated polyesters can react with monoethylenically unsaturated compounds, and the use of unsaturated polyesters with such monoethylenically unsaturated compounds is also described in the patents listed hereinbefore. Depending on the application involved and the viscosity of the polyester, it may correspond to about 20% to about 70% by weight of the total mixture.

These unsaturated polyesters are capable of interaction with monoethylenically unsaturated compounds to form cross-linked polymers. Because the polymers so formed are thermoset, they differ markedly from polymers produced by the reaction of monoethylenically unsaturated monomers or mixtures thereof, which mixtures were thickened before polymerization with a thermoplastic polymer.

The compositions of the present invention, even before the addition of a polymerizing catalyst, are reactive compositions, the reactivity depending on the specific composition being employed. If the compositions are to be used shortly after preparation, then no inhibitor addition is required. Their useful life can also be lengthened appreciably by storing said compositions under refrigerated conditions. If prolonged storage of the compositions is required, or if they are to be shipped in the normal channels of commerce, then the use of polymerization inhibitors is preferred. Suitable inhibitors are such vinyl polymerization inhibitors as tert-butylcatechol, hydroquinone, monoethyl ether of hydroquinone, and 2,5-di-tert-butylhydroquinone. The amounts required will vary somewhat depending on the specific monomer combination employed and the storage conditions, but from about 0.005% to about 0.1% by weight on the total weight of the monomers will effectively inhibit.

As disclosed hereinbefore, the compositions of the present invention are subjected to polymerizing conditions in forming the previously described composite structures. One such method of polymerization consists of the application of heat for a suitable period, while having present in the composition a free radical generating catalyst.

The organic peroxides represent one suitable class of free radical generating catalysts, typical of which include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc.

The amount of peroxidic catalyst required is roughly proportional to the concentration of the mixture of monomers. The usual range is 0.01% to 3% of catalyst with reference to the weight of the monomer mixture. The preferred range is from 0.02% to 0.5%, while the range of 0.02% to 0.25% is usually best. The optimum amount of catalyst is determined in large part by the nature of the particular monomers selected, including impurities which accompany said monomers.

Another suitable class of free radical generating compounds are the azo catalysts. There may be used, for example, azodiisobutyronitrile, azodiisobutyramide, azobis-($\alpha,\gamma$-dimethylvaleronitrile), azobis($\alpha$-methylbutyronitrile), dimethyl, diethyl, or dibutyl azobis(methylvalerate). These and other similar azo compounds serve as free radical initiators. They contain an —N=N— group attached to aliphatic carbon atoms, at least one of which is tertiary. An amount of 0.01 to 2% of the weight of monomer or monomers is usually sufficient.

Another method of effecting polymerization of the compositions of the present invention is by subjecting the uncured composite structure to ultraviolet light in the presence of suitable catalysts at ambient or slightly elevated temperatures. Such catalysts include benzoin, azoisobutyronitrile, etc. Although this method is limited to transparent composites which will transmit ultraviolet light, it is useful where it is desired to produce composites which exhibit poor resistance to elevated temperatures.

It will be understood by those skilled in the art that the useful life of the compositions of the present invention is appreciably decreased after the addition of the catalyst, the decrease being dependent on the specific monomers and the amounts thereof employed in the composition, the catalyst and amount thereof used, and the conditions of storage of the catalyzed composition.

In preparing the compositions herein described, the desired polymerizable monomers are stirred together until a homogeneous solution is obtained. The order of addition is not critical, but the monomers present in the smaller quantities are preferably added to the monomer or monomers which predominate. If a higher viscosity composition is desired, a homogeneous solution is prepared as hereinabove described, the desired amount of a polymer such as polymethyl methacrylate or polyester is added, and the mixture agitated until a homogeneous solution is obtained. Depending on the length and conditions of storage, the compositions so prepared may or may not be inhibited or refrigerated.

For use in the preparation of composite structures, the compositions of the present invention are catalyzed as hereinbefore described, degassed by the conventional vacuum technique to remove dissolved air, and, after incorporation into the composite structure, subjected to polymerizing conditions.

The details and methods of practicing the invention will be apparent by reference to the following specific examples, it being understood that these examples are merely illustrative embodiments of the invention and that the scope of the invention is not limited thereto. Unless otherwise so noted, all parts are by weight.

EXAMPLE 1

*(a) Preparation of a monomer mixture*

To 96 parts of methyl methacrylate monomer was added one part of glycidyl methacrylate, two parts of methacrylic acid and one part of vinyl triethoxysilane. The mixture was stirred until a homogeneous solution was obtained. Since the solution was to be used immediately, it was not refrigerated or inhibited.

*(b) Preparation of a composite structure*

A polymerization cell approximately 10" x 12" x 0.250" was constructed from two sheets of 0.005" nominal thickness flat drawn glass which was supported or backed-up by two sheets of 0.250" thick plate glass. An extruded tube of plasticized polyvinyl chloride was used as the spacer material to act as a liquid gasket to retain the monomer mix as well as to maintain the desired separation between the two pices of thin glass composing the mold surface. The mold was held together by conventional spring clip clamps, the assembly having the appearance of a conventional casting mold, for example, as shown in the United States Patent No. 2,091,615, with the plate glass surface lined with thin sheets of glass. The polymerization cell was filled with a thoroughly vacuum degassed composition prepared as described in (a) of this example to 100 parts of which composition had been added with agitation 0.02 part of benzoyl peroxide.

After polymerization on a time-temperature cycle of 16 hours at 60° C. followed by one hour at 110° C., the mold was opened, yielding a cast sheet with thin glass adhering to the surface. After heating the glass surfaced sheet to 140° C. for 40 minutes and cooling to room temperature, there was no separation between the glass and the organic polymer. This sample was subjected to the hot-cold cycle test and bending test as described hereinbefore.

EXAMPLE 2

*(a) Preparation of a thickened monomer mixture*

To 76 parts of methyl methacrylate was added one part each of glycidyl methacrylate and vinyl triethoxy silane and two parts of methacrylic acid. To this solution was added 20 parts of polymethyl methacrylate, and the mixture agitated until a homogeneous solution resulted. As in Example 1, this solution was used immediately and so inhibition or refrigeration was not required.

*(b) Preparation of a composite structure*

To 100 parts of the solution prepared as described in (a) of this example was added, with agitation, 0.02 part of a 25% solution of acetyl peroxide in dimethyl phthalate. This solution was degassed by application of vacuum and spread onto a sheet of polymerized methyl methacrylate. A thin sheet of glass was then laid over the solution in such a way as to exclude trapping of air bubbles. A metal plate was then applied to the assembly to provide sufficient pressure to keep the glass in contact with the cement during the cure cycle. Cure was effected on a polymerizing cycle of 16 hours at 60° C. followed by one hour at 110° C. After the assembly had been cured, the glass-plastic laminate was heat-treated at 140° C. for 40 minutes to normalize it and effect final cure and maximum adhesion. These assemblies withstood the temperature cycling noted hereinbefore.

This method of fabrication can be employed only when the plastic sheet to be used as the inner liner is soluble in the monomer mixture or swellable thereby.

EXAMPLE 3

*(a) Preparation of a monomer mixture*

To 96 parts of methyl methacrylate monomer was added one part of $\beta$-hydroxyethylmethacrylate, two parts of methacrylic acid, and one part of vinyl triethoxysilane.

The mixture was stirred until a homogeneous solution was obtained. Since the solution was to be used immediately, it was not refrigerated or inhibited.

(b) Preparation of a composite structure

A polymerization cell was prepared as described herebefore in Example 1(b). The prepared cell was filled with a thoroughly vacuum degassed composition prepared as described above in (a) of this example to 100 parts of which had been added with agitation 0.02 part of a 25% solution of acetyl peroxide in dimethyl phthalate. The composite structure was submitted to the polymerization conditions described in Example 1(b). Again there was no separation of the plastic and glass layers upon heating at 140° C., or upon hot-cold cycling as described hereinbefore.

EXAMPLE 4

(a) Preparation of a monomer mixture

To 96 parts of methyl methacrylate monomer was added one part of glycidyl methacrylate, 2 parts of acrylic acid and one part of vinyl triethoxysilane. The mixture was stirred until a homogeneous solution was obtained. The monomer mixture was refrigerated at 0° to 5° C. for two days before being used.

(b) Preparation of a composite structure

The refrigerated monomer composition as described in (a) of this example was allowed to warm up to room temperature and was then catalyzed and used as described in Example 1(b) hereinabove.

There was no separation of the glass and plastic layers when the finished composite structure was heated to 140° C., nor when subjected to the hot-cold cycling tests described hereinbefore.

EXAMPLE 5

Example 1 was repeated substituting 0.01 part azoisobutyronitrile for the benzoyl peroxide catalyst employed in Example 1. Comparable results were obtained.

EXAMPLE 6

(a) Preparation of monomer mixture

To 96 parts of methyl methacrylate was added one part glycidyl methacrylate, 2 parts acrylic acid, and one part vinyl triethoxysilane. The mixture was stirred until a homogeneous solution was obtained. Since the solution was used immediately, it was not necessary to inhibit or refrigerate it.

(b) Preparation of a composite structure

After catalyzing the composition as set forth in (a) of this example by dispersing 0.02 part of a 25% solution of acetyl peroxide in dimethyl phthalate in 100 parts of the composition, the catalyzed composition was degassed using the conventional technique and subjected to the polymerization conditions as set forth in Example 1(b).

There was no separation of the glass and plastic when the finished composite structure was subjected to 140° C., nor when subjected to the hot-cold cycling tests hereinbefore described.

EXAMPLE 7

To 80 parts of a polyester-methyl methacrylate solution (available commercially as Paraplex P-444), said polyester being the reaction product from phthalic and maleic anhydrides and propylene glycol, said polyesters being present to the extent of 75% of the total weight of the solution, was added 16 parts styrene, 1 part glycidyl methacrylate, 2 parts methacrylic acid, and 1 part of vinyltriethoxysilane. The mixture was stirred until a homogeneous solution was obtained. To this solution was added one part of benzoyl peroxide and agitation continued until the solution was again homogeneous.

This catalyzed mixture was polymerized exploying the conditions set forth in Example 1(b). Excellent adhesion of the plastic to the glass was obtained.

For the purpose of demonstrating utility, it is not necessary to inhibit or refrigerate the compositions of the present invention, but all the compositions described in the foregoing examples and the following example and set forth in detail in the foregoing specification can be stored indefinitely if refrigerated and can be shipped refrigerated in the normal channels of commerce. As set forth hereinbefore, they can also be inhibited and, in the inhibited form, have substantially indefinite shelf life and can be shipped unrefrigerated in the normal channels of commerce. As an example, the compositions set forth in Examples 1 to 8 can be inhibited for indefinite storage by the addition of 0.010% by weight of hydroquinone. The addition of 0.005% by weight of the monoethyl ether of hydroquinone and 0.005% by weight of 2,5-di-tert-butylhydroquinone also produces inhibited stable compositions.

As used throughout this application, the term "reactive hydrogen" refers to hydrogen atoms on functional groupings which react in the Zerewitinoff test.

EXAMPLE 8

To 96 parts of a 70% solution of unsaturated polyesters in styrene (available commercially as Paraplex P-43), said polyester being the reaction product from phthalic and maleic anhydrides and propylene glycol, was added one part glycidyl methacrylate, 2 parts methacrylic acid and one part vinyl triethoxysilane. The mixture was stirred until homogeneous and then one part of benzoyl peroxide was added. Agitation was continued until the peroxide was distributed uniformly. The catalyzed composition was subjected to the same polymerization conditions as outlined in Example 1(b).

The adhesion of glass to the thermoset polymer was excellent.

The glass employed for the surfacing operation should be as thin as possible, it being realized that ability to physically handle the glass represents one limitation. Thus, glass as thin as 0.001 inch can be successfully employed but requires careful handling. Glass up to 0.100 inch thick has been employed for surfacing plastics, but the thicker glass sheets are not as resistant to thermal shock as the thinner sheets are due, presumably, to the greater temperature differential between the two surfaces of the glass in the thicker sheets. Thus, preferred embodiments use glass sheets from about 0.001 to about 0.050 inch in thickness.

We claim:

1. A composition of matter comprising (a) a member of the group consisting of at least one polymerizable monoethylenically unsaturated monomer other than glycidyl acrylate and glycidyl methacrylate free from reactive hydrogen and consisting of no more than carbon, hydrogen and oxygen and mixtures of said monomers with unsaturated polyesters copolymerizable therewith, (b) a member of the group cosisting of glycidyl acrylate and glycidyl methacrylate and an hydroxyalkyl acrylate and methacrylate in which the alkyl group has from two to four carbon atoms, (c) a member of the group consisting of acrylic and methacrylic acid, and (d) alkenyl tri(alkoxy)silane in which the alkenyl group has two to four carbon atoms and in which the alkoxy group contains one to four carbon atoms, each of (a), (b), (c), and (d) being present in the compositions in parts by weight as follows: (a) 98.0 to 86 parts, (b) 0.5 to 5 parts, (c) 1 to 4 parts, and (d) 0.5 to 5 parts.

2. A product resulting from the polymerization of the composition of matter set forth in claim 1.

3. A composition as set forth in claim 1 in which the viscosity of the mixture of monomers has been substantially increased by dissolving in said mixture polymeric methyl methacrylate.

4. A compositon as set forth in claim 1 which contains a polymerization inhibitor.

References Cited in the file of this patent

UNITED STATES PATENTS

| | | |
|---|---|---|
| 2,007,645 | Geisel | July 9, 1935 |
| 2,024,389 | Renfrew | Dec. 17, 1935 |
| 2,231,471 | Hill | Feb. 11, 1941 |
| 2,453,194 | Buzzell | Nov. 9, 1948 |
| 2,532,583 | Tyran | Dec. 5, 1950 |
| 2,787,561 | Sanders | Apr. 2, 1957 |